United States Patent Office 3,453,158
Patented July 1, 1969

3,453,158
FUELED INORGANIC OXIDIZER SALT AQUEOUS EXPLOSIVE COMPOSITION CONTAINING INDEPENDENTLY DISPERSED GAS BUBBLES AND METHOD OF MAKING SAME
Robert B. Clay, 728 West 3800 South,
Bountiful, Utah 84010
No Drawing. Continuation-in-part of application Ser. No. 488,803, Sept. 20, 1965. This application July 3, 1967, Ser. No. 650,628
Int. Cl. C06b 1/04
U.S. Cl. 149—41
17 Claims

ABSTRACT OF THE DISCLOSURE

By incorporating a gel forming or slurry thickening agent in the liquid component, i.e. in a solution of oxidizer salts, prior to adding the solids which are to be suspended therein (as fuels, sensitizers, etc.) followed or accompanied by agitation to produce a foam structure, blasting compositions are made more sensitive to detonation and their sensitivity is better controlled. Finely divided bubbles or voids which are widely distributed, are fixed in place and serve as reactive sites or centers to promote sensitivity and facilitate its control.

---

The present application is a continuation in part of Ser. No. 488,803, filed Sept. 20, 1965 now abandoned.

BACKGROUND (1) This invention relates particularly to gel or slurry type blasting compositions in which particulate solid fuels and/or sensitizers such as finely divided aluminum or other metal particles, carbonaceous or hydrocarbonaceous particles, and/or explosive granules and particles such as coarse granules of TNT, smokeless powder, RDX, etc., are suspended in a liquid to form a slurry. The liquid is or usually becomes a viscous liquid or sets up to a gel so that the suspension is stable. The liquid commonly is a concentrated, often saturated, solution of one or more powerful oxidizing salts, such as ammonium nitrate (AN), sodium nitrate (SN), ammonium or alkali metal chlorates, perchlorates, mixtures of any two or more of these, and the like. Part of the oxidizers may be added later to the gel or slurry as particulate solids in some cases. The presence of finely divided particulate fuels or sensitizers renders the salts more sensitive to detonation and/or provides fuel to balance or partially balance their normal excess of oxygen. In many cases fuels per se act also as sensitizers. Sensitization and its control are highly important. This invention deals primarily with sensitization.

(2) The use of ammonium nitrate slurries of high nitrate content, sensitized in various ways and containing various ingredients as fuels, sensitizers and other modifiers, has increased greatly in recent years. Such are described, for example, in U.S. Patents 2,930,685, Reissue 25,695, 3,249,474, 3,249,477 and others. In some of these slurries, relatively expensive aluminum may be used and sometimers hazardous fuels and sensitizers are used. The use of coating agents on aluminum particles to entrap air bubbles on the particle surfaces has been described in U.S. Patent No. 3,249,474. Temperature-sensitivity relations are important. Some of the sensitized slurries of the prior art are too hazardous for use at high temperatures or they may be too insensitive for practical use at low temperatures. Gel forming agents or thickeners generally have been added as solid particles along with other particulate solids, e.g. fuels, in the past. Sensitivity generally can be controlled, within limits, by choosing and adjusting the type and quantity of sensitizer and/or of the fuel particles used but a closer control is highly desirable. However, it takes time for conventional thickener particles such as guar gum, starch, etc., to dissolve and set up or control the gel structure. Also, it is desirable to reduce the cost by minimizing quantitative requirements, particularly of the more expensive ingredients such as fine quality (e.g. paint grade) aluminum powders, coated aluminum, and the like. The present invention makes these desired qualities or conditions possible.

SUMMARY

The present invention may be summarized as follows: The thickener or gelling agent, or at least a part of it, is incorporated in the liquid solution of oxidizer salt, i.e. after the salt or a substantial part of it has first been dissolved in the liquid, to thicken it to a sufficient degree to fix and hold or control a foam structure, or system of sensitizing bubbles, very fine and widely distributed. Such a bubble system may be produced by agitation, or by the act of introducing and blending the particulate solids, with or without supplemental agitation. Such a system is very effective to promote and control sensitivity. At any appropriate time, when or after the thickening agent becomes effective in the oxidizer solution for its purpose, the desired foam or bubble structure may be formed or produced in a suitable manner, e.g. by agitation, by ingredient control, control of surface tension, etc. This foam or bubble structure is immediately fixed or "locked" into the gel or slurry because of the viscosity of the liquid phase. The very numerous and very small bubbles or voids act as reactive sites or "hot spots" to promote sensitization. Since many of them are essentially fixed in place, they do not coalesce to form undesirably large bubbles or escape from the liquid or gel surface. They remain in the liquid or thickened liquid phase where they are effective to promote and control sensitivity. By their use, quantities of other usual sensitizers can be greatly reduced or even completely eliminated in some cases. The invention thus improves the quality and the quality control of slurry or gel type blasting compositions. At the same time it reduces their cost.

DESCRIPTION OF PREFERRED EMBODIMENT

In a preferred embodiment, a small amount, say 0.01 to 0.5% of an efficient gel forming gum, such as guar gum is incorporated in the oxidizer solution. If less efficient thickeners are used, the quantities should be increased proportionately. The oxidizer solution presently preferred is an aqueous solution containing a substantial proportion of ammonium nitrate, preferably including also some sodium nitrate. However, other oxidizer salts, as previously mentioned, can be used. The gum can be added most conveniently by first dispersing or dissolving it in an efficient water miscible solvent or agent. Ethylene glycol can be used for this purpose in a preferred procedure.

At least a part and, if desired, all of the thickening gum may be added in this manner. Alternatively the guar gum may be added by other means, for example by rapidly agitating the thickener into the solution or by use of a "seperan" funnel. Substantial improvements in sensitivity may be obtained over those achieved in the past, even while using smaller quantities and/or less effective qualities of particulate sensitizing ingredients. The sensitizing ingredients may include any of those used in the past such as self-explosive particles, i.e. TNT, smokeless powder, RDX, etc., but usually it is or comprises aluminum. Where a fine grained or flaked aluminum, e.g. the relatively expensive paint grade, has been used in the past, frequently in substantial quantities to obtain a given level of sensitivity, much less, or in some cases none of this metal at all may be necessary to obtain the same sensitivity level when the procedures and materials of this invention are employed.

Generally in the prior art the thickener, such as guar gum, for example, has been added to an aqueous or largely aqueous solution of oxidizer salts as a dry ingredient, along with the other dry particulate materials such as finely divided metal, with or without carbonaceous fuels such as coal, gilsonite, etc., and/or sulfur, and with or without added quantities of oxidizer salt added in dry particulate form. These materials, often with others, sometimes referred to collectively as the "dry mix" or "pre-mix," are stirred into the solution, preferably a water or at least an aqueous (water-containing) solution of oxidizer salts. The salt in the original solution commonly includes ammonium nitrate in substantial, usually major proportions, but it may comprise other oxidizers. Sodium nitrate is often included, usually in lesser quantities than the ammonium nitrate but in some cases it may be present in larger quantities. Other salts, already named, such as ammonium or alkali metal chlorates or perchlorates may be used or included, with or without those recited above. Usually the solution will be saturated or nearly so. If more oxidizer is desired, an additional part of one or more of the oxidizer salts mentioned may be added to or with the dry ingredients or pre-mix. The primary liquid is usually water but it may be or include other materials.

The gum or other thickener, or at least part of it, is added to the oxidizer solution in any suitable manner, per se, or dispersed in glycol, etc. and allowed to hydrate before the other dry ingredients or so-called "pre-mix" are stirred into it. As a result, the liquid component becomes substantially more viscous. These liquid and solid materials are then stirred together with agitation so as to create within the gel or slurry many tiny spaced but widely distributed voids or bubbles of air. The step of introduction of the particulate solid itself introduces fine dispersion of air and/or associated gases. For want of a better descriptive term the resulting tiny air pockets may be referred to collectively as a foam structure, though it will be understood that the bubbles are exceedingly small and are widely spaced in proportion to their diameters, whereas in most conventional foams the gas bubbles would fill most of the volume. Preferably the slurry or gel is not aerated so extensively as to make it highly foamy or spongy and it is preferred that the foam shall not cause its density to decrease more than a few percent, in some cases up to 25 or 30 percent, below its normal unaerated density. In some cases the density reduction may be as great as 30 percent or more but in many cases it may be only 1 to 5 percent or less. A reason for limiting the aeration is that the power of an explosive in a filled borehole may be reduced more than proportionately as density is reduced, in some cases. In other cases, however, a minor reduction in density may give an increase in blasting energy.

In an aluminum sensitized slurry, the mixing of the aluminum powder into an oxidizer solution which contains a prehydrated gel, e.g. guar gum, results in entrapment of air and the agitation produces very many tiny voids. In one sample examined under a microscope, for example, the bubbles appeared to have diameters of the general order of 1 to 100 microns, more or less, and more specifically most where between 5 to 50 microns. It was estimated that there were about 100,000 to 1,000,000 bubbles or voids per cubic centimeter in this particular sample but the number could be much greater or it could be smaller. Still, this sample would not be described as "spongy." Depending on the type and the energy of mixing or of homogenization, the useful number of bubbles would appear to range in the order of 10,000 to 10,000,000 per cubic centimeter.

The formation of the bubbles, as well as their stabilization as discussed hereinafter, is greatly facilitated by adding at least part of the thickener to the oxidizer solution before solid particles which are not to be dissolved are added. The amount by which the density of the overall composition is reduced is a function, of course, of both the average size and the total number of the voids or bubbles. Both size and number can be controlled within reasonable limits by the procedure of this invention, i.e. by adjusting the amount of gum in the solution (or of other thickener), and by controlling the amount and type of mixing and/or aeration.

These voids or bubbles distributed widely and fairly homogeneously through the liquid phase are found to be highly effective sensitizers in themselves. They appear to act as reaction centers or "hot spots" to propagate the detonation wave when the explosive slurry or gel is set off.

It should be emphasized that not all of the gum or other thickener to be included in the final product has to be added to the oxidizer solution. While the solution should be thickened enough to stabilize or fix the tiny bubbles against undue coalescence or against too extensive escape from the surface of the mix, it is often desirable to have a fluid and readily pumpable slurry. That is, the slurry should not be too thick to pump by mechanical means and with reasonable force through a hose or conduit. It should set up quite thickly in the borehole, however, to prevent gravitational segregation of the suspended solids. Where ground water is present the slurry should have good resistance against leaching, intrusion or disintegration by such water. This further setting up preferably should be achieved quickly after the slurry is in the hole since, if the suspended solids such as particles of fuel or of metal (e.g. aluminum) should segregate or separate by gravity from the suspending salt solution, detonation may fail or be faulty. Preferably, the gel or slurry is fairly easily pumpable as it moves into the borehole (or package) and then it should set up right away, at least before appreciable segregation or water intrusion can take place.

An advantage of the present invention is that a much greater range of sizes, shapes and qualities of suspended particles, i.e. of metal and/or other fuel or sensitizer particles can be used. Some of these otherwise would not be suitable in many types of sensitized slurry, either because they do not have ideal characteristics, because they may not be coated satisfactorily for the purposes mentioned above, or for other reasons. High density aluminum powders of very fine particle size, for example, those obtained by atomization, are often very difficult to coat satisfactorily. Hence they are less effective as sesnsitizers than other types. With such materials, and without benefit of the reactive sites obtained in this invention, excessive amounts of other sensitizers, either self-explosive particles or additional fine and relatively expensive aluminum, for example, may be required to get the desired sensitivity. Also, with fine aluminum powders and other finely divided metals and with some other fuels there is danger of dust explosions and/or flash fires during mixing and handling prior to blending the powders with the oxidizing solution. Usually it is highly important that these slurry materials not be cap sensitive at the mixing temperatures of the slurry, which may be high, e.g. as 65° to 80° C. or so. Such slurries tend to be much more sensitive at such temperatures, by several times or even orders of magnitude, than at the usual temperature of use in the borehole, often considerably lower, e.g. normally 5 to 30° C. By adding the gum or other thickener, at least in part, to the original oxidizer salt solution, and adding more later if needed, so that it will become effective by the time the slurry reaches the borehole, the finished mixes may be made somewhat more viscous than conventional mixes, but still pumpable at the time they are to be loaded. This is of particular benefit in loading wet boreholes. Wear on slurry pumps, which can occur with thick slurries, is reduced by adding gum, e,.g. guar gum, to the oxidizer solution rather than adding it later dry. With equal overall viscosity, the lubricating qualities of the slurry are improved by the use of gum in the oxidizer solution. However, only moderate quantities of gum or of starch, which can be used similarly, should be added in this manner if the slurry is to be pumped. If higher final viscosity in the borehole is required, more of the same and/or another thickener, can be added or activated later.

It may be found difficult to add thickener to the liquid oxidizer solution without forming a gel quickly, i.e. before final blending of the dry particulate materials into the liquid is complete. An aqueous oxidizer solution may thicken in spots and become lumpy if dry guar gum is added directly. However, by first blending guar gum into ethylene glycol in a suitable ratio, e.g. about 1 to 2 or 1 to 3 parts by weight of gum to glycol, a liquid dispersion of gum is obtained which can be more evenly dispersed in the solution before hydration and thickening become significant. The glycol mix can be added slowly to the oxidizer solution while the latter is being stirred. Guar gum in the liquid may vary from about 0.01% up to about 0.5% by weight, based on the total finished slurry or gel. More gum may be added later, either with the dry ingredients or separately, to bring the total up to as high as about 2%. Corresponding suitable concentrations for starches preincorporated in the solution may be about 0.02% to about 2.7%. Additional starch, to bring the total to 5% or more can be added later. These proportions, however, can be varied, often desirably about 0.05% to 0.25% for guar gum and 0.15% to 2.0% or so for starches, pre-added to the solution. In general, higher concentrations lead to solutions which may become too thick to pump conveniently after the gum has hydrated, particularly if substantial cooling occurs. However, anomalies have been noted in some exceptional cases where the quantities of gum or starch, etc., in solution, can be increased by several fold, e.g. up to 5% or more of starch, without the solution becoming too viscous for early handling. A delay in thickening effect sometimes may be encountered.

A number of solutions and slurries or gels were prepared along the lines just described and the results are tabulated in Table I. It will be noted that in part A of the table, the use of increasing amounts of the gum in solution lowered the slurry or gel overall densities to a small but increasing extent, particularly for the case of slurries containing aluminum C, where conditions excepting the gum concentration were kept constant. There was also a marked increase of sensitivity in this series as the proportions of thickener pre-added to the solution were increased.

It was found in these compositions that uncoated aluminum was per se a relatively ineffective sensitizer, i.e., promoter of detonation, although, of course, it had good fuel value. The coated fine grade aluminum gave much superior sensitizing results compared with uncoated aluminum. Nevertheless it was found possible to detonate slurries which contained only fine uncoated aluminum at temperatures as low as 5° C. and with only 0.2% of the fine aluminum added. This result was obtained by using 0.2% of guar gum in the oxidizer solution and allowing it to hydrate before the dry ingredients were added. In this case there was additional thickener (guar gum) added in the dry mix, more from the latter source in fact than was in the solution. It should be noted that the dry particulate ingredients included aluminum, sulfur and gilsonite, all of which were added as fuels, plus ammonium nitrate (because it would not all dissolve in the amount of solvent employed at the desired solution temperature). Normally, with this type of material, about 1.5% of the fine grade aluminum (Mix No. 4), or even more would be required for propagation and successful full detonation of such a charge in a 6″ diameter borehole at 5° C. The latter temperature is about that encountered in boreholes in Northern latitudes or in the higher mountains in the United States.

In addition to the greater ingredients cost of materials employing this quantity of finely divided aluminum, the cap sensitivity problem at the initial temperatures can be a serious one. Mix No. 16 was a typical example of an earlier type slurry made with a good coated fine particle grade of aluminum, using also substantial proportions of coarse aluminum (9.3%). It required 0.7% of the fine coated aluminum to get detonation in a 6-inch column, confined in a cardboard tube. It should be kept in mind that in such a slurry the coated aluminum also helps to sensitize the mix because the coating tends to build up reactive sites or voids on the metal particles themselves.

As a result of the improved sensitization properties obtained by the present invention it has been found possible in cold weather operations to raise the solution "fudge point" (the temperature at which the solution precipitates the salts and starts to set up like a fudge) from about 28° C., which was previously practiced, to 33.5° C. This mixing at a higher temperature, with safety, makes it possible to carry more of the oxidizer in the solution and still maintain the same safe sensitivity range. Correspondingly, one can reduce the quantities of dry particulate ingredients which are added to obtain a desired sensitivity level, thus reducing handling hazards. Moreover, such a slurry is easier to pump but it still has the equivalent and desired viscosity by the time it reaches the borehole.

Mixes No. 2A and 10 in the table represent the use of an aluminum "grade T," in the form of a fine dense powder. Slurries including this grade are as difficult to detonate as those containing the U grade. The proportion of gum in solution was varied to obtain test results. By increasing the proportions of the gum in the original oxidizer solution from 0.1% to 0.2% it was possible to reduce the fine aluminum required for sensitization from 0.5% to 0.2%. The "LS" aluminum was a 90% aluminum alloy. Particle size of the latter fell mainly in the −28 to +48 mesh range. Such aluminum has some fuel value but practically no actual sensitizing properties. It was noted that an orthodox slurry made with this particular aluminum would not detonate, even with as much as 1.5% of the fine aluminum added, unless gum also was added to the oxidizer solution. Detonation was obtained with 2.0% fine aluminum, but this product also was cap sensitive at the mixing temperature. It was therefore considered hazardous and unsuitable for use.

In part B of Table I, both the proportions of the fine aluminum and of the gum were varied, to keep the sensitivity approximately constant. It will be noted from the data that increasing the gum in the solution allowed continuing and corresponding reductions in required quantities of fine aluminum. Compare the first four mixes. In other words, the data indicate that the voids in the slurry, or sensitizing effect of the reaction centers associated with particles of the fine aluminum, was systematically being replaced by using gum in the oxidizer solution, evidently setting up other voids or reaction centers in the liquid phase of the slurry. The latter were probably located randomly, as far as association with any particulate ingredient is concerned. Apparently the voids so produced were uniformly distributed throughout the entire product.

Moreover, and this is considered important, the gum in the examples of part B, Table I, had thickened the oxidizer solution enough that the voids or tiny bubbles remained substantially in place, without coalescing or escaping from the slurry. The viscosity of the liquid phase at the time of aeration apparently should be sufficient that, in general, the voids do not migrate and coalesce to form larger (but fewer) bubbles to any very large extent or to escape in large proportions from the surface. This is a fundamental concept of the present invention.

It will be noted further that the density at which this slurry would detonate in 6-inch column diameter increased uniformly with the concentration of fine aluminum; that is, as greater amounts of fine aluminum were used, less or fewer voids or reactive sites in the form of fine gas bubbles were required for a given sensitivity. Similar tendencies have been noted in other slurries; that is, for a given sensitivity level, high densities consistent with a given desired sensitivity can be obtained by using a coated particular aluminum, and particularly a very fine particled aluminum which is coated with a material which resists wetting by the liquid menstruum. In other words, a reaction center or void, or a tiny gas bubble, which is associated with an aluminum particle appears to be an efficient type of sensitizer but voids in other places also may contribute to sensitivity. Mix No. 3 of part B in the table, represents an example in which coal rather than gilsonite was employed as a fuel. The particle size of this coal was not completely determined, but most particles appeared to be about 300 mesh or finer. Coal is an excellent fuel in such slurries; it appears to be somewhat more effective than gilsonite when used with similar quantities of aluminum.

Parts C and D of the table list examples of warm borehole (circa 25° C.) blasting agent, thickened primarily with tapioca flour, rather than with guar gum. The same considerations appear to apply as with guar gum, however, so far as its effect in the aqueous solution of oxidizer salt is concerned. By mixing at least a part of the thickener into the solution, adding the remainder, if needed, with the dry particulate fuel ingredients, a slurry is formed which is not too thick for prompt pumping into the borehole, but which thickens up further and promptly, due to the added but delayed action thickener. It will be noted that batches 67 and 68 were particularly satisfactory. These employed only 0.1% of fine aluminum. The fine aluminum employed in this particular instance apparently has an additional advantage in that it helps the premix drys flow and feed better. However, it has been found that blasting agents of this type can be detonated successfully with no aluminum whatsoever, as illustrated by Mix No. 2 in part D.

Addition of cross-linking agents, e.g. metal salts such as borax, alkali metal dichromates, permanganates, etc., with the particulate solids tends to facilitate and expedite thickening and fixing the bubbles in place. There appears also to be a relationship between density per se and the sensitivity of a slurry or gel blasting composition when other factors are equal, as indicated above. The technique of putting the thickening gum or starch into the oxidizer salt solution before adding the dry ingredients, so that it will produce the desired reaction centers, is a good method for controlling density as well as for obtaining sensitization, while also reducing aluminum requirements. Moreover, the problem of undesirable sensitivity, often encountered in high aluminum mixes, is avoided because the aluminum requirements are reduced.

The results are summarized in the table as follows:

TABLE I

Solution ......................... AN SN H₂O ST E.G. Gum
Parts (33° soln. temp.) ........ 38 15 17 0.1 (as listed)

(A) COLD BOREHOLE

| Mix No. | E.G. | Gum | Drys | | | | | | Density | | Results (5° C.) |
| | | | W | Other Al | S | Gil | IR | AN | (27° C.) | (5° C.) | |
|---|---|---|---|---|---|---|---|---|---|---|---|
| 8 | 0.4 | 0.02 | | 10 C | 4 | 2 | 1.1 | 12.52 | 1.33 | 1.41 | 5F₇ 6F₄ |
| 7 | 0.4 | 0.05 | | 10 C | 4 | 2 | 1.0 | 12.45 | 1.31 | 1.39 | 5F₅ 6D |
| 6 | 0.4 | 0.2 | | 10 C | 4 | 2 | 0.6 | 12.7 | 1.27 | 1.34 | 4D 5D |
| 2 | 0.4 | 0.2 | | 10 U | 4 | 2 | 0.5 | 12.8 | 1.29 | 1.38 | 4F₉ 5F₈ 6F₁₆ |
| 3 | 0.4 | 0.2 | 0.2 | 9.8 U | 4 | 2 | 0.6 | 12.7 | 1.28 | 1.35 | 5F₂ 6D |
| 16 | | | 0.7 | 9.3 CR | 4 | 2 | 1.1 | 12.8 | 1.35 | 1.41 | 5F₁₀ 6D |
| 2A | 0.2 | 0.1 | 0.5 | 9.5 T | 4 | 2 | 0.8 | 12.8 | 1.30 | 1.38 | 4F₃ 5D |
| 10 | 0.4 | 0.2 | 0.2 | 9.8 T | 4 | 2 | 0.6 | 12.7 | 1.30 | 1.36 | 5F₁₀ 6D |
| 4 | | | 1.5 | 8.5 LS | 4 | 2 | 1.2 | 12.7 | 1.33 | 1.44 | 6F₁₆ |
| 6A | | | 2.0 | 8.0 LS | 4 | 2 | 1.2 | 12.7 | 1.31 | 1.40 | 4D 5D |
| | | | | | | | | | | (cap sen) | |
| 5 | 0.3 | 0.1 | 0.8 | 9.2 LS | 4 | 2 | 1.0 | 12.5 | 1.30 | 1.38 | 5F₇ 6D |

(B) COLD BOREHOLE

| Mix No. | E.G. | Gum | Drys | | | | | | Density | | Results (5° C.) |
| | | | W | Other Al | S | Gil | IR | AN | (27° C.) | (5° C.) | |
|---|---|---|---|---|---|---|---|---|---|---|---|
| 7 | 0.4 | 0.01 | 0.8 | | 6 | 4 | 1.1 | 17.59 | 1.27 | 1.33 | 5F₅ 6D |
| 6 | 0.4 | 0.05 | 0.7 | | 6 | 4 | 1.1 | 17.65 | 1.25 | 1.32 | 5F₈ 6D |
| 5 | 0.4 | 0.10 | 0.6 | | 6 | 4 | 1.0 | 17.8 | 1.23 | 1.31 | 5F₈ 6D |
| 6(A) | 0.4 | 0.20 | 0.4 | | 6 | 4 | 0.5 | 18.4 | 1.21 | 1.28 | 5F₁₁ 6D |
| 4 | | | *1.2 | | 6 | 4 | 0.9 (MB-8) | 17.8 | 1.27 | 1.34 | 5F₄ 6D |
| 3 | | | 0.8 | | 6 | 5.2 (coal) | 1.2 | 16.7 | 1.26 | 1.35 | 5F₉ 6D |

(C) WARM BOREHOLE

| Mix No. | E.G. | Gum | Drys | | | | | | Density | | Results |
| | | | W | Other Al | S | Gil | IR | AN | | | |
|---|---|---|---|---|---|---|---|---|---|---|---|
| 4¹ | 0.4 | 0.01 | | 10 C+20 | 3 | 0.99 | 2.8 T.F.** | | 1.35 (57° C.) | 1.39 (25° C.) | 4F₆ 5D (25° C.) |
| 3¹ | 0.4 | 0.05 | | 10 C+20 | 3 | 1.25 | 2.5 T.F.** | | 1.31 (58° C.) | 1.34 (25° C.) | 4D 5D (25° C.) |
| 1² | 0.1 | 0.05 | | 8.5 T | 3.5 | 2.0 | 3.0 T.F.** | | 1.29 (59° C.) | 1.36 (35° C.) | 4D 5D (35° C.) |
| 3² | 0.02 | 0.01 | 0.2 | 9.8 LS | 1.5 | 2 | 3.5 T.F.** | | 1.35 (58° C.) | 1.43 (25° C.) | 4F₈ 5D (25° C.) |
| 2³ | | | | 10 C | 2.0 | 1.5 | 2.9 T.F.** 0.1 IR | | 1.35 (56° C.) | 1.41 (25° C.) | 6F₁₀ (25° C) |
| 68⁴ | 0.15 | 0.05 | 0.1 | 9.9 [A] | 1.3 | 2 | 3.5 T.F.** 0.2 IR | | 1.29 (60° C.) | 1.39 (25° C.) | 4D 5D (25° C) |

(D) WARM BOREHOLE

| Mix No. | E.G. | Gum | Drys W | Other Al | S | Gil | IR | AN | Density | | Results |
|---|---|---|---|---|---|---|---|---|---|---|---|
| 8[1] | 0.4 | 0.01 | 0.1 | 1.1 CK | 8 | 3 | 2.8 T.F.** | 1.79 SN | 1.30 (58° C.) | 1.37 (25° C.) | 5F₄ 6D (25° C.) |
| 1[1] | 0.4 | 0.01 | | 1.2 CK | 8 | 3 | 2.5 T.F.** | 2.05 SN | 1.27 (58° C.) | 1.33 (25° C.) | 4F₃ 5D (25° C.) |
| 5[1] | | | 0.2 | 1.0 CK | 8 | 3 | 3.0 T.F.** | 2 SN | 1.34 (56° C.) | 1.40 (25° C.) | 6F₆ (25° C.) |
| 67[5] | 0.15 | 0.05 | 0.1 | 1.1 39/44 | 5.2 | 3 | 3.5 T.F.** 0.3 IR | | 1.27 (60° C.) | 1.33 (25° C.) | 4F₄ 5D (25° C.) |
| 2[5] | 0.4 | 0.2 | | | 6.6 | 3 | 3.0 T.F.** | | 1.23 (60° C.) | 1.30 (25° C.) | 4F₄ 5D 6D (25° C.) |

[1] Solution _____ AN SN H₂O ST E.G. Gum
  Parts (70° C. soln. temp.)___58.7  9  15  0.1  (as listed)
[2] Solution _____ AN SN H₂O ST E.G. Gum
  Parts (70° C. soln. temp.)___54.9  13.0  15.0  0.1  (as listed)
[3] Solution _____ AN SN H₂O ST
  Parts (70° C. soln. temp.)___55.2  12.7  15  0.1  _____
[4] Solution _____ AN SN H₂O ST E.G. Gum
  Parts (70° C. soln. temp.)___54.9  13  15  0.1  (as listed )
[5] Solution _____ AN SN H₂O ST E.G. Gum
  Parts (70° C. soln. temp.)___57.4  13.6  15.7  0.1  (as listed)
* This mix in general requires 1.0–1.2 of W for proper sensitivity depending upon the other ingredients.
** T.F.—Tapioca flour.
AN—Ammonium nitrate.

SN—Sodium nitrate.
ST—Stabilizer.
IR—Fast hydrating natural gum used for thickening.
C—Good coated ground foil (−20 +40 mesh).
U—Uncoated ground foil (−20 +40 mesh).
CR—Good coated ground foil (essentially −8 mesh).
T—Very fine dense aluminum powder.
LS—High density ground alloy containing about 90% Al (primary −28 +48 mesh with some finer material).
W—Paint grade aluminum used for sensitization.
C+20—Good coated ground aluminum foil (primarily −8 +20 mesh).
(A)—Assorted ground radar chaffs and uncoated ground foils.
CK—Fine machine turnings and grindings that have been coated.
39/44—Radar chaff ground through ⅛ or 1/20 inch screen.

By adding a small amount of cross-linking agent, e.g. 0.01 to 0.05% (borax in this case) to the compositions in part D of Table I, along with the dry mix, the bubbles were considerably better stabilized. The compositions were somewhat thicker than formerly but still not too viscous to pump.

The results in the above table are indicated in terms of column diameters of the explosive charges as they failed, partly failed or detonated. Thus 5F₅6D means that a 5-inch diameter charge of length at least six times its diameter partly failed, leaving 5 inches of the 30 inch long column unexploded but a 6-inch diameter charge, 36 inches long, detonated completely, and left a large crater in the ground on which it rested.

In general, the compositions of the present invention comprise at least 40% by weight and preferably 50% to 85% of inorganic oxidizer. The major part usually and preferably is ammonium nitrate and a minor part sodium nitrate, but the latter may exceed the proportions of AN, and the other inorganic oxidizer salts previously noted may be added or substituted. Water comprises preferably a major part at least of the liquid phase, the quantity of liquid being sufficient, i.e. at least 5% and up to 25% or more by weight of the total, to form at least a plastic slurry or gel, i.e. a mobile or flowable mass, preferably one which when first formed can be pumped at moderate pressures through a conduit such as a hose or pipe, and which will flow or settle into place to substantially fill all irregularities in cartridges, packages or boreholes, etc., up to the full desired column height, or essentially so. The composition usually includes at least one additional or supplementary sensitizer besides the thickener and the fine bubbles it promotes and stabilizes, preferably non-explosive per se. Such sensitizer may be merely an added quantity of the same, or of another thickener, incorporated in the slurry after the oxidizer solution has already been thickened sufficiently to hold a substantial number of the tiny gas or air bubbles in place. The thickener dispersed in the oxidizer solution before any solids are added, is preferably a gum but may be a starch or a mixture of gum and starch. If a gum, e.g. guar gum, is used it preferably is in proportions of 0.01 to about 0.5%, usually between about 0.05% and 0.3%, based on the total composition. This gum or thickener is incorporated preferably prior to mixing the dry insoluble fuel or sensitizer particles into the oxidizer solution. In any case it is incorporated in such a way as to increase the viscosity of the solution, thereby to "fix" the very small voids or bubbles at least to a reasonable degree against coalescing or escaping from the mixture. Obviously, the larger bubbles will not be fixed, nor is it necessarily desirable to hold them. In so doing, the thickener with its entrapment of the very tiny bubbles, may or may not significantly reduce the overall density of the composition while at the same time increase its sensitivity to detonation. As noted above, a small reduction of density in itself may actually increase the sensitivity of the slurry. Other gases than air may be incorporated, if desired, with generally similar results. It is an observed fact that very small gas bubbles actually are entrapped or fixed in the manner described and that the sensitivity of the blasting composition is reliably and definitely increased.

Some compositions, as tabulated above, which had part of the thickener mixed into the solution of oxidizer before the insoluble solids were added, had slightly lower densities and in some cases substantially lower densities than those made without such incorporation. This would be expected from the incorporation of a very large number of very small bubbles, as has been observed through a microscope. Compare, for example, the first three mixes in Table I–A where the density dropped progressively as the gum added via solution was increased. Note also that Mix No. 16 was most dense of all, although they all had the same proportions of metal and the added dry AN (ammonium nitrate) did not vary significantly. Sensitivity increased progressively also, for small quantities of gum, with increase of gum added to the solution. Mix No. 2 was much less sensitive than Mix No. 6; the essential difference here was the use of uncoated vs. coated aluminum of the same kind. A fine bubble entrapment apparently occurred with the bubbles in this case on particles of the coated aluminum. The gum used in the solution technique, however, rendered Mix No. 3 more sensitive than Mix No. 16 which contained considerably more fine aluminum (W) than Mix No. 3 and also contained a coated aluminum. Mix No. 16 probably should have been the more sensitive, had it not been for the sensitization imparted by the fixed fine bubbles due to the gum in solution.

When a mix (No. 6A) without gum in solution had its fine aluminum content increased to 2.0%, it became cap sensitive at 27° C. This is not desirable in most situations because it involves hazards in handling the material, especially true under warm temperature conditions. As seen in Table I–B, progressively increasing the gum in solution makes it possible to progressively decrease the fine aluminum content and thus retain essentially the same desirable sensitivity at ordinary temperatures with a reduction in the undesirable type of high temperature sensitivity due to aluminum. See the first four mixes. Mix No. 4 tests indicated that fine aluminum has to be increased substantially for equivalent sensitivity when gum thickener is not premixed into the solution. This appears to be true, even if an equivalent total amount of thickener is added later. Apparently the later added thickener becomes effective too late to trap the desirable very fine bubbles (if fine bubbles are formed in blending as is usually the case). Hence the reactive sites appear to be fewer and the composition is less sensitive. A progressive decrease in density with an increase of gum in solution is apparent here also.

It appears to be important to have the voids, bubbles, or reaction sites, as they have been referred to variously, as numerous and widely dispersed as possible. A few large bubbles may make as much or greater difference in density but not in sensitivity. By vigorous agitation suitable for breaking larger bubbles into many much smaller ones, sensitivity can be increased without substantial change in density.

The last line in Table I-B indicates that in cold boreholes, a fine coal dust has enough sensitizing effect to offset the lack of gum in solution. The coal particles appear to entrap bubbles and form reactive sites. Thus coal dust apparently accomplishes in a slightly different way the same desired result of setting up multitudinous active sites, stably fixed and dispersed in the slurry, which sensitize and aid in its initiation and propagation.

In Table I-C, the first two mixes, respectively, show a similar decrease in density and increase in sensitivity as the quantity of gum in solution is increased. These compositions contained no fine paint grade aluminum. They contained identical quantities, 10%, of a coated aluminum obtained from foil by grinding. Here tapioca flour "T.F." was used in the dry ingredients as an additional thickening agent. It has greater fuel value than guar gum and is an excellent material to use for thickening or gelling the composition, when its temperature requirement for good thickening can be met. It requires a somewhat elevated temperature for satisfactory mixing (56° to 60° C.).

For mixes containing high proportions of fine aluminum, the sensitivity of a slurry might well be too great for safety, at the mixing temperatures required, if tapioca flour were used. The same is true, in general, of other starches, although the properties of different starches vary somewhat. For mixes containing little or no fine aluminum the starches, which are, of course, carbonaceous, and have good fuel value, are very desirable. All the compositions in Table I-C are regarded as highly satisfactory except the fifth, No. 2, which contained no gum in solution. It is probably too insensitive for general use and evidently it was deficient in reaction centers or sites.

All the compositions in Table I-A contained 15% of sodium nitrate in solution of oxidizer material, and contained 4% sulfur in the dry ingredients. This combination of ammonium nitrate and sulfur contributes to sensitivity in itself, as set forth in some of the patents previously referred to.

In Table I-B, sulfur was increased to 6% and in Table I-D, in several cases, to 8%, generally with progressive increases in sensitivity when other factors were held constant. In Table I-C, the amount of sulfur was varied somewhat, as a further means of adjusting sensitivity. Where small quantities of fine aluminum were added, as in Mixes Nos. 3 and 68, they were useful also to make the products feed and flow better, e.g. in mechanical feeding of dry ingredients and in automatic pumping of slurry, etc. The fine aluminum apparently was not really needed here as a sensitizer. Incorporation of the thickener into the solution by vigorous mixing, or in any way that entraps the bubbles, is one effective way to enhance sensitivity. Mixing in the dry particulate solids is another, and both may be used. To the extent that this creation of foam also reduces density, the sensitivity may be enhanced somewhat further but this effect is considered to be a minor factor compared to the sensitizing effect resulting from production and fixation of reactive sites in the gel or slurry.

Table I-D shows in the last line, Mix No. 2, that aluminum can be dispensed with altogether for warm boreholes (25° C.). This is accomplished by combining the sensitizing technique of the gum in oxidizer solution, with its effect of creating tiny sensitizing bubbles and the further sensitizing effect of a combination of sodium nitrate and sulfur, as shown in U.S. Patents 3,249,476 and 3,282,752, as already mentioned. The use of a starch, such as tapioca flour, with its good fuel value probably aids further. Where other than paint grade aluminum is used, such as the fine machine turnings "CK," as in the second Mix, No. 1, the composition showed greater sensitivity without fine aluminum than, say, Mix No. 8 showed with 0.1% "W" or paint grade aluminum. The main difference readily observable here is in density; the less dense material appears to be more sensitive when other factors are unchanged.

By manipulating the several sensitivity promoting factors and modifiers and by considering temperatures of mixing and of use, these compositions can be "tailor made" to fit almost any desired situation. The fine aluminum may be adjusted in quantity (or eliminated altogether in some cases); the total proportions of sulfur and sodium nitrate may be adjusted and also their ratio to each other adjusted as a further sensitivity control. Gilsonite or coal, or both, or other carbonaceous materials, as well as the starches previously mentioned, may be added to contribute fuel value, or to coat the aluminum and make it more effective. In the latter case these aid in establishing active reaction sites on the solid particles distributed throughout the mass of the explosive. The inclusion of a small amount of starch in the dry "premix" is often desirable to control the plasticity or penetration of the finished slurry to limit its penetration or mixing with stemming materials, but, in general, the gum and starch are interchangeable.

Cross-linking agents for the guar gum or starch thickener, e.g. metal salts such as borates, alkali metal dichromates, permanganates, etc. are useful in small quantities, especially where the amount of thickener in the oxidizer solution is small or where greater or more rapid thickening effects are desired. When guar gum is used, 0.001 to 0.3 of cross-linking agent or so is normally adequate, or up to about 0.5% or more if starch or some other thickener less efficient than guar gum is used. The combination of any or all of the materials and variables discussed above with the use of the gum, starch, or other thickener-in-solution techniques, is a most important aspect of the present invention. Control of density is also important, since density variations can be used to some degree to adjust the sensitivity as well as the blasting power of slurry blasting agents.

Additional experiments show the effects of cross-linking the gum in solution and of eliminating thickener altogether from the dry "pre-mix."

Example E-1

AN (ammonium nitrate) _____parts by wt.___ 38
SN (sodium nitrate) _____parts___ 15
Phosphate type stabilizer _____do____ 0.1 were dissolved in 17 parts of water. To this was added 0.2 part of guar gum predispersed in 0.4 part of ethylene glycol.

A dry "pre-mix" was made up of 0.65 part of paint grade flaked aluminum, 0.85 part of coarser aluminum powder, 5.2 parts sulfur, 3.5 parts powdered gilsonite, 1.8 parts of tapioca fluor, and 0.025 part of borax. The dry mix and 17 parts of particulate AN were then blended into the oxidizer solution with vigorous agitation.

The resulting slurry had a density of 1.24 at 33° C. and 1.28 at 5° C.

Example E-2

In the same basic oxidizer solution as in E-1 it was decided to incorporate what seemed a fairly high level of thickener, 0.3 part of guar gum dispersed in 0.6 part of ethylene glycol. The dry premix was essentially the same as in Example E-1, except that the borax was increased to 0.06 part, the tapioca flour was eliminated, and the ammonium nitrate was increased to 18.5 parts. Density was slightly less with the increase of guar gum from 0.2 to 0.3. The comparison is shown below:

TABLE II

| Mix | Density 33° C. | 5° C. | Thickener | Borax | Results at 5° C. |
|---|---|---|---|---|---|
| E-1 | 1.24 | 1.28 | 0.2 guar, 1.8 flour | .025 | 4F₃ 5F₄ 6D |
| E-2 | 1.22 | 1.26 | 0.3 guar | .06 | 4F₃ 5F₃ 6D |

The two mixes were essentially equal in sensitivity. In this type of mix, 3% of flour has been used in the past. By using 0.2 part guar gum in E-1, the flour was reduced to 1.8%. In E-2 the flour was completely eliminated by using a little more guar gum in the solution and by increasing the borax cross linker from .025 to 0.06%.

Sodium dichromate can be ued as cross-linker instead of borax. It appears to be somewhat slower in action, giving less initial cross-linking of gum, but after 5 minutes it forms a stiffer gel than the borax.

The desired fine bubbles or "foam structure" may be formed by simple agitation of the oxidizer solution, either before, during or after addition of the solid ingredients which are suspended (or dissolved) therein. The fixation or locking of the bubbles into the finished slurry or gel, due to the viscosity increase caused by the thickener in the solution is an important aspect of this invention.

Compositions of this nvention have several advantages in addition to their controlled sensitvity. They are not sensitive at high mixing temperature, 60 to 80° C. They reduce wear on pumps when pumps are used, making smooth blends. They facilitate control of density and blasting power, as well as sensitvity. They reduce requirements for relatively costly and/or hazardous particulate materials such as fine grades of aluminum or self-explosives.

The proportions of the various ingredients named above, along with others which are conventional and which suggest themselves to those skilled in the art, all may vary widely. While, as a rule, ammonium nitrate is the largest single ingredient, the other oxidizers mentioned above may replace it in minor part, largely, or even completely in some cases. Particulate explosive sensitizers such as TNT, smokeles power, RDX, etc., can be used but are not needed in most cases. Enough liquid is used to render the composition as plastic, mobile, pourable, or fluid, as may be needful for the particular use and method of operation. Water preferably is the preponderant liquid ingredient but glycols and other water compatible alcohols, amines, amides or the like, individually or in combination, may be used along with or even in lieu of water. Ethylene glycol is useful especially as a dispersant in getting the gum or thickener into the aqueous solution before the dry ingredients are added. Chlorates and perchlorates of ammonia and of the alkali and alkaline earth metals as well as the corresponding nitrates are intended when referred to in the claims by the term "inorganic."

What is claimed is:

1. A pumpable, sensitized explosive composition of the aqueous gel or slurry type, which comprises a fuel and substantial proportions of at least one inorganic oxidizer salt selected from the group which consists of ammonium nitrate, alkali metal nitrates, and ammonium and alkali metal chlorates and perchlorates, at least part of said oxidizer salt being dissolved in an aqueous liquid phase, particulate matter including material tending to promote detonation suspended in said liquid phase, the liquid phase being present in adequate proportions to suspend said particulate matter and to render the total composition plastic and mobile, said liquid phase comprising a thickener and also containing a sufficient number of very small bubbles of gas independently dispersed throughout said phase to significantly increase sensitivity of the whole composition to detonation, said thickener being selected from the group which consists of gums and starches and being present in the liquid phase in sufficient quantity to fix and stabilize the gas bubbles in the liquid phase at the time of aeration.

2. Composition according to claim 1 which includes 0.001 to 0.3% by weight, based on the total composition, of a cross-linking additive for the thickening agent, to increase its thickening effect.

3. Composition according to claim 1 which contains carbonaceous fuel.

4. Composition according to claim 1 which includes a finely divided particulate metallic aluminum.

5. Composition according to claim 4 wherein the aluminum is coated with a material repellant to the liquid.

6. Composition according to claim 1 wherein the thickener in the liquid phase comprises a galacto-mannan gum in proportions by weight, based on the total composition, of 0.01 to 0.5%.

7. Composition according to claim 1 wherein the gas bubbles are air bubbles.

8. Composition according to claim 1 wherein the oxidizer includes ammonium nitrate and sodium nitrate.

9. Composition according to claim 1 which includes sulfur.

10. The method of making a mobile or pumpable slurry or gel blasting agent which comprises the steps of incorporating before adding insoluble particulate ingredients a sufficient amount to entrap or fix small gas bubbles as stated hereinafter of a gel former or thickener in a concentrated liquid solution of at least one inorganic oxidizer salt, said salt being selected from the group which consists of ammonium nitrate, the alkali metal nitrates and the ammonium and alkali metal chlorates and perchlorates, adding to the thickened solution a fuel or sensitizer which comprises insoluble particulate solids to said liquid solution in proportions suitable for forming a slurry, said composition comprising fuel susceptible to oxidation by said oxidizer salt, blending the solids into the liquid and agitating at least the liquid component at a suitable time during the process in a manner to produce a very large number of very small bubbles of gas independent of said insoluble solids in the liquid phase of the slurry, the thickener being sufficient in quantity to substantially fix said fine bubbles at the time of their incorporation against coalescence in or emergence from said slurry, whereby the slurry or gel is sensitized to a substantial degree of said fine bubbles.

11. Method according to claim 10 wherein the thickener is guar gum in proportions of about 0.01 to 0.5%, based on the weight of the total composition.

12. Method according to claim 10 wherein the particulate solids comprise an additional quantity of thickening agent beyond that included in the solution.

13. Method according to claim 10 wherein bubbles are formed which have diameters in the general order of magnitude of about 1 to 100 microns and are present in numbers of the order of magnitude of 10,000 to 10,000,000 per cubic centimeter.

14. Method according to claim 10 wherein the foam structure is further thickened by adding a starch thickener.

15. Method according to claim 10 which includes dispersing from about 0.01 to about 0.5%, by weight, based on the total composition, of a guar gum thickener in a glycol and adding such dispersion to the liquid phase after oxidizer salts have been dissolved in the liquid.

16. Composition according to claim 1 which includes 0.02 to 2.7% of starch by weight, based on the total composition, as a thickener.

17. Composition according to claim 6 which includes additional thickener up to total proportions equivalent to 2% of guar gum.

References Cited
UNITED STATES PATENTS

| | | | |
|---|---|---|---|
| 1,186,065 | 6/1916 | Aubert et al. | 149—18 |
| 3,249,474 | 5/1966 | Clay et al. | 149—44 X |
| 3,288,658 | 11/1966 | Ferguson et al. | 149—2 X |
| 3,288,661 | 11/1966 | Swisstack | 149—2 X |
| 3,382,117 | 5/1968 | Cook | 149—44 X |

BENJAMIN R. PADGETT, *Primary Examiner.*

S. J. LECHERT, *Assistant Examiner.*

U.S. Cl. X.R.

149—40, 42, 43, 44, 60, 61, 70, 71, 76, 82, 83, 85

UNITED STATES PATENT OFFICE
CERTIFICATE OF CORRECTION

Patent No. 3,453,158                          July 1, 1969

Robert B. Clay

It is certified that error appears in the above identified patent and that said Letters Patent are hereby corrected as shown below:

Column 14, lines 39 and 40, cancel "to said liquid solution" line 51, "of" should read -- by --.

Signed and sealed this 21st day of April 1970.

(SEAL)
Attest:

Edward M. Fletcher, Jr.                      WILLIAM E. SCHUYLER, JR.
Attesting Officer                               Commissioner of Patents